J. CORWIN.
PNEUMATIC TIRE.
APPLICATION FILED OCT. 15, 1909.
965,281.
Patented July 26, 1910.
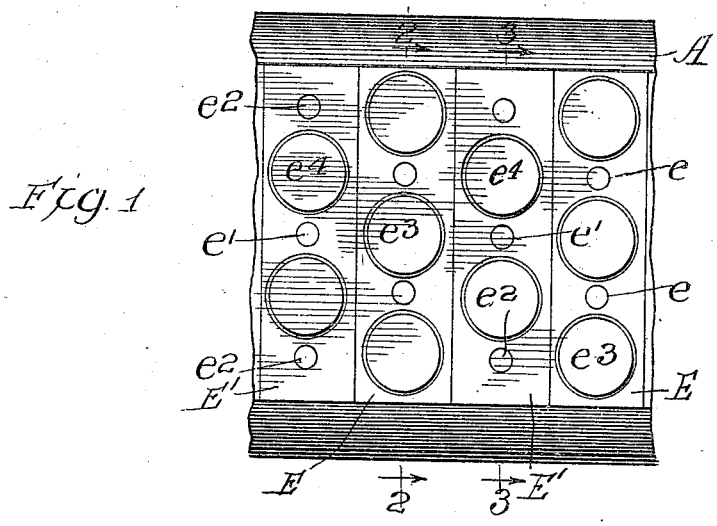
Fig. 1
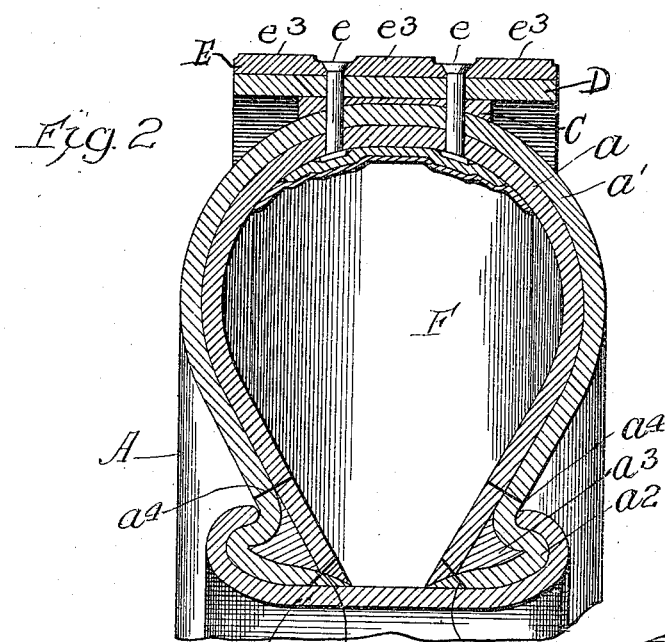
Fig. 2
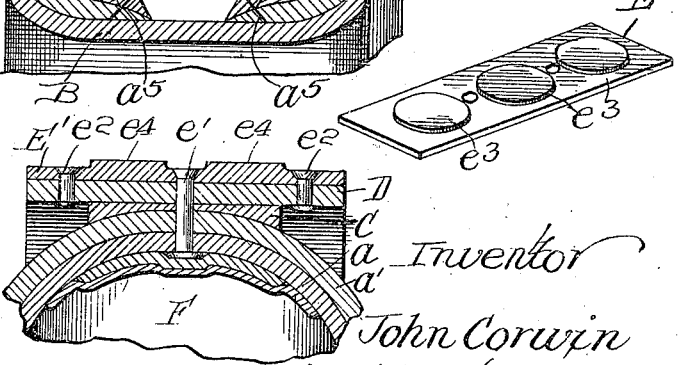
Fig. 3
Fig. 4
Witnesses:
H. R. L. White
R. A. White
Inventor
John Corwin
By W. W. Withenbury,
Atty.

United States Patent Office.

JOHN CORWIN, OF CHICAGO, ILLINOIS.

PNEUMATIC TIRE.

965,281.   Specification of Letters Patent.   Patented July 26, 1910.

Application filed October 15, 1909. Serial No. 522,714.

*To all whom it may concern:*

Be it known that I, JOHN CORWIN, a citizen of the United States, and residing at Chicago, in the county of Cook and State of Illinois, have invented a new and useful Improvement in Pneumatic Tires, of which the following is a complete specification.

This invention relates to improvements in pneumatic tires and more particularly to a tire of that class having a flat tread, the lateral edges of which are out of contact with the casing.

Heretofore tires have been provided with treads which project horizontally at their edges so that they are out of contact with the tire casing which curves inwardly therefrom, thereby leaving a wedge shaped space between said edges and the casing. This has been found to be objectionable on roads where sand and gravel are encountered because of the tendency of the sand and gravel to work into and become engaged in the spaces thus afforded and cut the casing.

The object of this invention is to provide a tire which, while it is provided with a flat tread, does not in any way interfere with the resiliency of the tire and is so constructed as to prevent obstacles which would ordinarily wear the casing from becoming lodged between the edges of the tread and the casing.

It is a further object of the invention to provide a tire having a metallic tread surface capable of freely yielding to the inequalities of the road so as not to interfere with the resiliency of the tire and which affords an anti-skidding and non-puncturable tire.

The invention consists of the matters hereinafter described in the specification and more fully pointed out and defined in the appended claims.

In the drawings: Figure 1 is a fragmentary plan view of a tire embodying my invention. Fig. 2 is a section taken on line 2—2 of Fig. 1. Fig. 3 is a fragmentary section taken on line 3—3 of Fig. 1. Fig. 4 is a perspective view of one of the traction plates.

As shown in said drawings: A indicates the outer casing of the tire, which may be of any desired construction, but which preferably, and as shown, comprises a leather casing formed of two thicknesses or layers $a$ and $a'$ which are rigidly engaged together by cementing or in any other preferred manner. The tire as shown is of the clencher type and the outer layer, $a'$, is curved outwardly at its edges to provide a bead $a^2$ adapted to conform to the curvature of the wheel rim B and in the groove thus formed is inserted the filler $a^3$, of leather or any other desired material, and the inner layer is brought down over said filler and rigidly engaged thereto and to the outer layer by cementing and by a line of stitching $a^4$ and $a^5$ located respectively above and below the filler.

On the tread surface of the casing and rigidly engaged thereto by cementing or the like, is a welt C of yielding material, such as soft leather, and which as shown is flat transversely thereof on its outer surface and grooved on its inner surface to conform to the curvature of the tire, thereby providing an abrupt shoulder at each outer edge. Extending around said welt and projecting laterally therefrom at either edge is the tread strip D of leather or other suitable material, which if desired may be cemented to the welt. A plurality of metallic plates E and E' are engaged on the tread strip, with the adjacent edges thereof in close contact. The plates E are secured in place by means of rivets $e$ passing therethrough and through the tread strip, welt and casing, and the plates E' are each secured in place by means of a central rivet $e'$ which also extends therethrough and through the strip, welt and casing, and by end rivets $e^2$ which pass through the plate and the edges of the strip D, as shown more clearly in Figs. 2 and 3. The plates E and E' as shown are arranged alternately on the strip and transversely thereof, and are provided respectively with bosses or lugs $e^3$ and $e^4$, which project from the outer faces of the plates and, as shown more clearly in Fig. 1, are arranged staggering on adjacent plates. The inner surface of the casing, adjacent the tread, is lined with a plurality of layers of fabric F, or other suitable material, which entirely covers the heads of the rivets and prevents their contacting with the inner tube, not shown.

The operation is as follows: When the tire is in use the broad tread affords a maximum gripping surface and the raised lugs or bosses act to prevent its skidding. The welt C affords an abrupt shoulder in each of the spaces formed between the edges of the tread and the casing and entirely prevents sand, gravel and other obstacles from lodging between the casing and the tread strip, thereby avoiding any tendency of the same to cut the leather. Inasmuch as the welt is slightly yielding in texture it prevents the casing from breaking at the edges of the welt.

While I have shown the tire as of the clencher type it is obvious that it may be of any other preferred type, and it is obvious also that the welt may be of any desired thickness and width dependent upon the size of the tire.

I claim:

1. In a device of the class described the combination with a casing of a tread therefor comprising a welt concaved on its inner surface to fit the curvature of the tire, a tread strip overlying said welt and projecting laterally beyond the edges thereof, closely arranged metallic plates on said strip, and rivets engaging said plates, strip and welt to the casing.

2. In a tire the combination with a casing of a tread therefor comprising a tread strip and a relatively narrow strip on the inner side thereof having a central concave groove adapted to fit the transverse curvature of the casing, closely arranged metallic plates on the outer side of said tread strip, and rivets extending through said casing, strip and plates.

3. In a device of the class described the combination with a casing of a strip extending around the periphery thereof and grooved in its inner side to fit the transverse curvature of the tire, a tread strip projecting laterally beyond the edges of the grooved strip, a metallic covering of varying thickness for said tread strip, and means for securing said tread strip, grooved strip and casing together.

4. In a device of the class described the combination with a casing of a tread strip thereon, means affording an abrupt shoulder intermediate each edge of said strip and the center of the periphery of the casing, and a plurality of plates on said strip, each having a plurality of bosses thereon.

5. In a device of the class described the combination with a casing of a tread strip thereon, means affording an abrupt shoulder intermediate each edge of the strip and the periphery of the casing, a plurality of closely arranged plates covering said tread strip and having a plurality of bosses thereon, and rivets extending through the structure thus formed.

In testimony whereof I have hereunto subscribed my name in the presence of two witnesses.

JOHN CORWIN.

Witnesses:
　W. W. WITHENBURY.
　E. R. WALKER.